(12) United States Patent
Izumisawa et al.

(10) Patent No.: US 7,589,855 B2
(45) Date of Patent: Sep. 15, 2009

(54) IMAGE FORMING APPARATUS

(75) Inventors: Souichi Izumisawa, Tagata-gun (JP); Mutsumi Nochi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 748 days.

(21) Appl. No.: 11/165,790

(22) Filed: Jun. 23, 2005

(65) Prior Publication Data

US 2006/0290972 A1    Dec. 28, 2006

(51) Int. Cl.
*G06F 15/00* (2006.01)
*H04N 1/00* (2006.01)
*H04N 1/40* (2006.01)

(52) U.S. Cl. .................. 358/1.15; 358/434; 358/440; 358/444

(58) Field of Classification Search .............. 358/1.15, 358/400, 402, 404, 406, 434, 435, 436, 438, 358/440, 442, 444, 468, 437

See application file for complete search history.

(56) References Cited

U.S. PATENT DOCUMENTS

| | | | | |
|---|---|---|---|---|
| 6,137,597 A * | 10/2000 | Kanaya | ...................... | 358/402 |
| 6,281,987 B1 * | 8/2001 | Yoshida | ...................... | 358/434 |
| 6,639,689 B1 * | 10/2003 | Kuwahara | .................. | 358/1.15 |
| 7,006,259 B1 * | 2/2006 | Takaoka | ...................... | 358/405 |
| 7,206,085 B1 * | 4/2007 | Eguchi | ...................... | 358/1.15 |
| 7,227,654 B1 * | 6/2007 | Tanaka | ...................... | 358/1.15 |
| 2002/0048051 A1 * | 4/2002 | Momonami et al. | ......... | 358/440 |
| 2002/0149791 A1 * | 10/2002 | Ozawa et al. | .............. | 358/1.16 |
| 2003/0067628 A1 * | 4/2003 | Toyoda et al. | .............. | 358/1.15 |
| 2003/0081261 A1 * | 5/2003 | Tanimoto | ................... | 358/400 |
| 2003/0117665 A1 * | 6/2003 | Eguchi et al. | ............... | 358/402 |
| 2003/0117666 A1 * | 6/2003 | Eguchi et al. | ............... | 358/402 |
| 2003/0206314 A1 * | 11/2003 | Tanimoto | ................... | 358/1.15 |
| 2004/0196500 A1 * | 10/2004 | Ichiki | ........................ | 358/1.15 |
| 2006/0268349 A1 * | 11/2006 | Tamura | ...................... | 358/400 |

FOREIGN PATENT DOCUMENTS

| | | |
|---|---|---|
| JP | H9-252368 | 9/1997 |
| JP | 2001-86313 | 3/2001 |

* cited by examiner

*Primary Examiner*—Madeleine A Nguyen
(74) *Attorney, Agent, or Firm*—SoCal IP Law Group LLP; Steven C. Sereboff; John E. Gunther

(57) ABSTRACT

An image forming apparatus determines whether or not facsimile data with transmission terminal identification data added thereto is transferred on the basis of received transmission terminal identification data when receiving the facsimile data with the identification data. The apparatus retrieves whether or not a box to which the identification data is put as a name and to which a setting to transfer the received facsimile data is set is created in a storage unit when determining to transfer the received facsimile data. The apparatus transfers the received facsimile data in accordance with the setting of the box, when it is determined that the box is present.

18 Claims, 10 Drawing Sheets

| Box number | Transfer kind | Transfer destination | Receiving setting |
|---|---|---|---|
| 0331234567 | E-mail | xxx@xxx.co.jp | Not setting |
| ⋮ | ⋮ | ⋮ | ⋮ |
| 0356789012 | FAX | xxxxxxxxxx | Not setting |
| 0378901234 | iFAX | xxx@xxx.co.jp | Not setting |
| ⋮ | ⋮ | ⋮ | ⋮ |
| 0390123456 | File storing | C:¥xxxx¥xxxxx | Not setting |
| ⋮ | ⋮ | ⋮ | ⋮ |
| 12345 | FAX | 0345678901 | Not setting |
| ⋮ | ⋮ | ⋮ | ⋮ |

F code setting

F code setting

23f

Store  Cancel

*Necessary input

*Box number

Password

User name

Comment

Report notify
☐ Transmit error message
☐ Transmit job complete message
E-mail address
Constant print ▶

Manuscript print

IMAGE FORMING APPARATUS

BACKGROUND OF THE INVENTION

1. Field of the Invention

The present invention relates to an image forming apparatus for transferring facsimile data received from the outside.

2. Description of the Related Art

In general, a fax machine having a facsimile function and a multi functional peripheral (MFP) or the like being an image forming apparatus having the facsimile function are well known. Some of apparatuses having such a facsimile function have a function of transferring received facsimile data to other fax machine or transferring the received facsimile data to other MFP or PC by Internet facsimile (iFAX) or electronic mail (E-mail) via a network. This transfer of the received facsimile data is performed through F code relay using, for example, "SUB".

The F code relay is as follows. A box to which a prescribed number preset within 20-digit as the "SUB" is put as its name is prepared at an apparatus on a receiving side. A transfer destination of the facsimile data is set to the box in advance. When performing facsimile transmission, a sender transmits the facsimile data after adding the "SUB" to an apparatus on a transmitting side. The apparatus on the receiving side which has received the facsimile data with the "SUB" added thereto transfers or stores the received facsimile data in accordance with a transfer setting which is set to the box corresponding to the "SUB" added to the facsimile data.

As mentioned above, in the transfer of the facsimile data through the F code relay, when transmitting the facsimile data, the sender must instruct the apparatus on the receiving side to perform preset operations. Put otherwise, if the sender has not intentionally input the "SUB" to transfer the facsimile data to the preset transfer destination, the received facsimile data could not be transferred by means of the apparatus on the receiving side.

When intending to transfer the facsimile data with no "SUB" added thereto, it is possible to set a transfer setting as a unique setting. If such a setting is performed, the apparatus on the receiving side transfers the whole of the received facsimile data to the preset identical transfer destinations. However, the sender cannot change transfer destinations for each transmission origin of the facsimile data. With this situation, it is inconvenient in the case of shared use of the fax machine.

Accordingly, there is a need for an image forming apparatus which can transfer the received facsimile data in response to the transmission origin of the facsimile data even if the sender has not a consciousness of the transfer of the facsimile data by the apparatus on the receiving side when the sender transmits the facsimile data.

BRIEF SUMMARY OF THE INVENTION

According to an aspect of the present invention comprises a receiving unit configured to receive facsimile data with transmission terminal identification data added thereto; a determining unit configured to determine whether or not the received facsimile data is transferred on the basis of the identification data received at the receiving unit; a retrieval unit configured to retrieve whether or not a box to which the identification data is put as a name and to which a setting to transfer the received facsimile data is set is created in a storage unit when the determining unit determines to transfer the received facsimile data; and a transfer unit configured to transfer the received facsimile data in accordance with the setting of the box if the retrieval unit determines a presence of the box.

Objects and advantage of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 9 is a table showing a relation between a box and the transfer setting in the first embodiment;

FIG. 12 is a view showing the display unit when an "F code" is selected in the second embodiment;

FIG. 13 is a view showing a display example of the display unit when a new button is input in the second embodiment;

Figure 14:
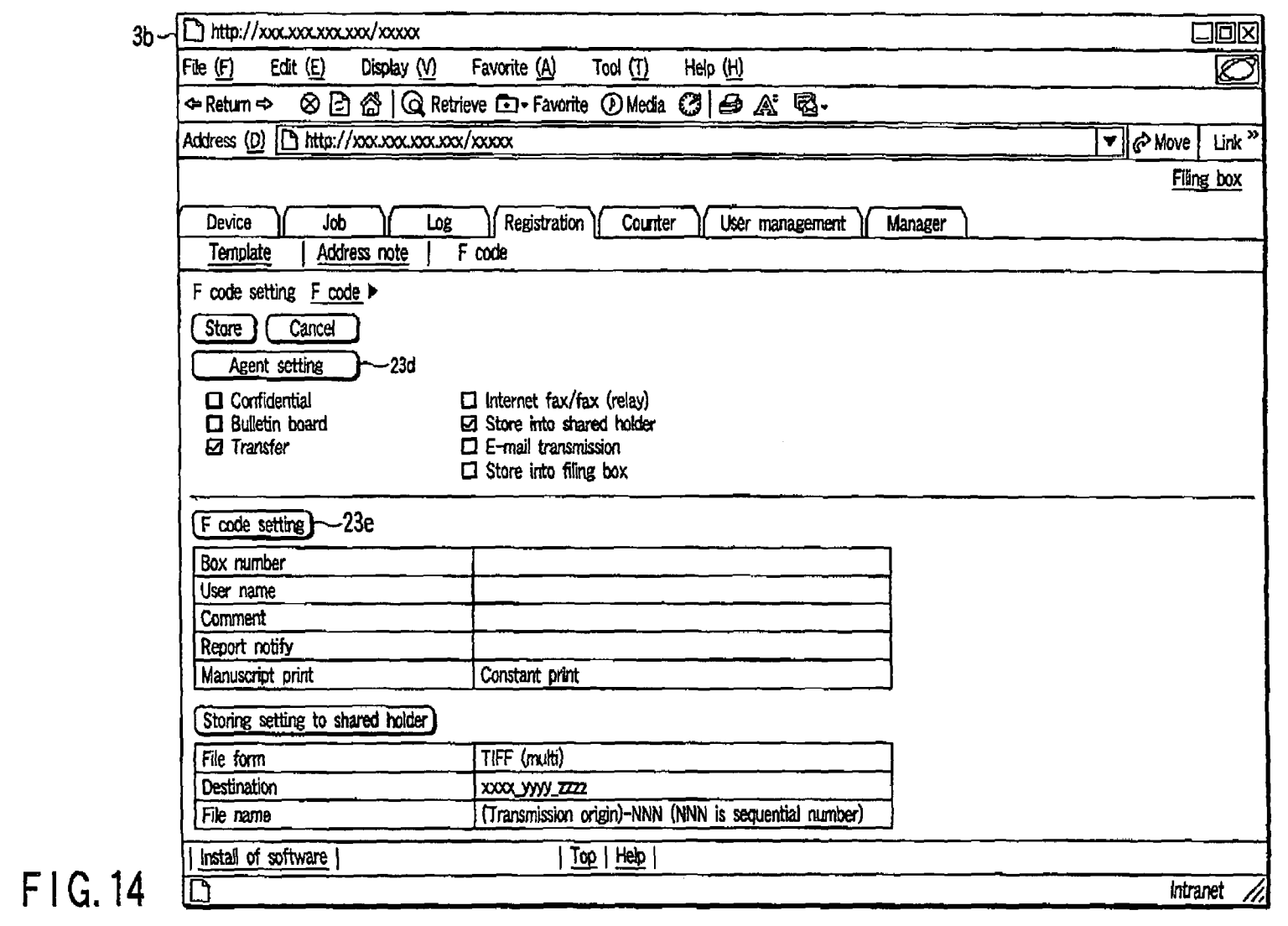

FIG. 14 is a view showing a display example of the display unit when an icon to set an agent is input in the second embodiment; and FIG. 15 is a view showing a display example of the display unit when a box number is set in the second embodiment.

DETAILED DESCRIPTION OF THE INVENTION

Figure 1:
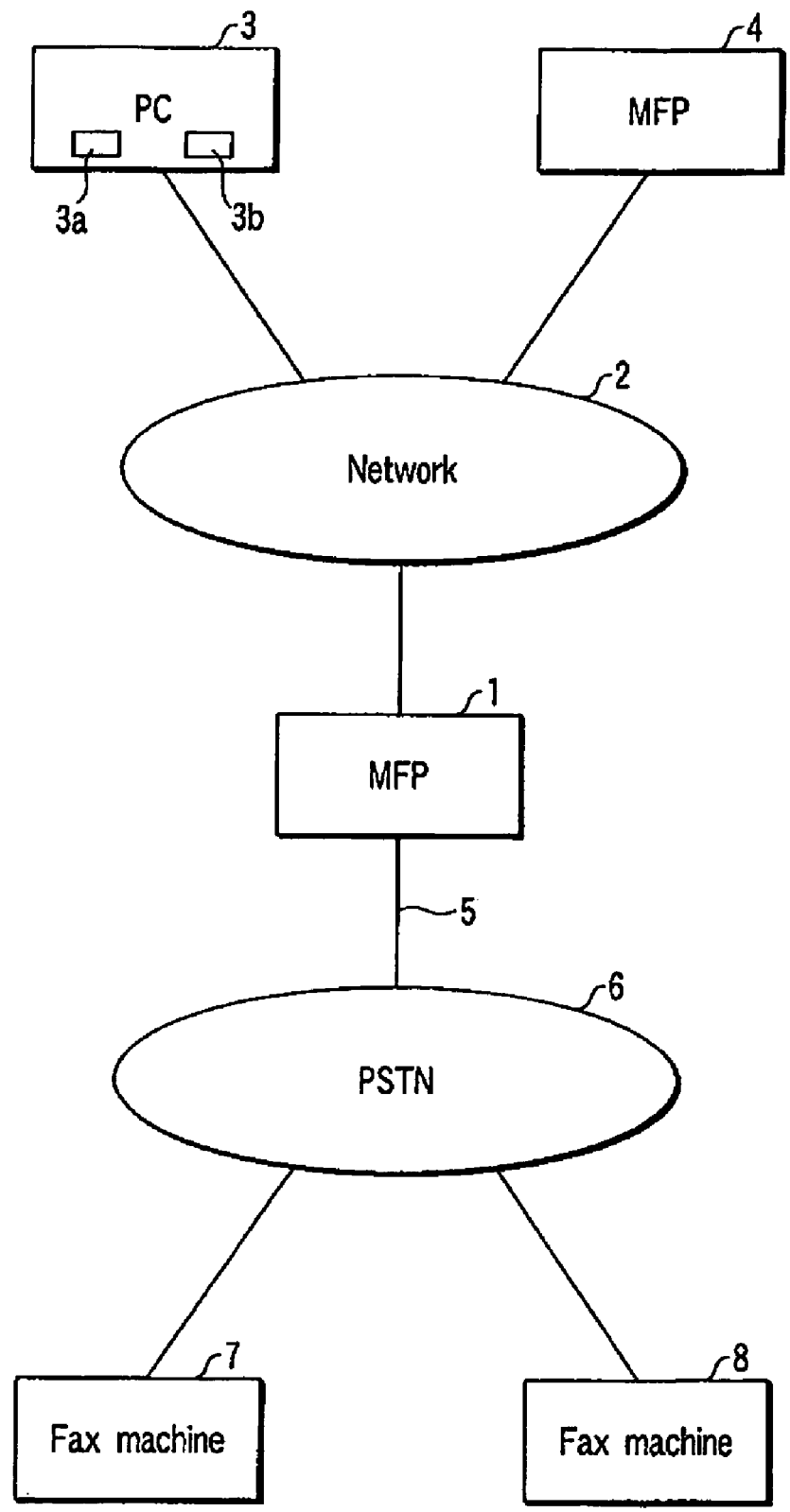
FIG. 1 is a view schematically showing a network configuration in a first embodiment of the invention.

Hereinafter, each embodiment of the invention will be explained by referring to the drawings.

FIRST EMBODIMENT

FIG. 1 is a view schematically showing a network configuration to which a multi function peripheral (MFP) 1 is connected. The MFP 1 is a multi function printer having a facsimile function, a printer function, a copy function, a scanner function, a network function, etc. As shown in FIG. 1, the MPF 1 is connected to a PC 3 and an MFP 4 via a network 2. The PC 3 has an operation unit 3a and a display unit 3b, an address on the network is "xxx@xxx.co.jp". The network 2 may be the Internet, but it is a local area network in this embodiment. The first embodiment will be described in the case that the PC 3 and MFP 4 connected to the network with the MFP 1 is connected thereto is a single set, respectively. However, the number of the PC 3 and MFP 4 are not limited to one each.

The MFP 1 is connected to a public switched telephone network (PSTN) 6 via a PSTN subscriber line 5. The PSTN 6 connects fax machines 7 and 8. A telephone number "0331234567" is assigned to the fax machine 7. A telephone number "0345678901" is assigned to the fax machine 8. When transmitting facsimile data, the fax machine 7 transmits data indicating a telephone number to a transmission terminal identification (TSI). The TSI is a transmission terminal identification signal transmitted in a phase B. The TSI (optional in accordance with ITU recommendations) is utilized by displaying it on a display unit or printing it in a receiving management report at an apparatus on a receiving side. The fax machines to be connected to the PSTN 6 will be explained in the case of two fax machines 7 and 8; however, the number of the fax machines is not limited to this case.

Figure 2:
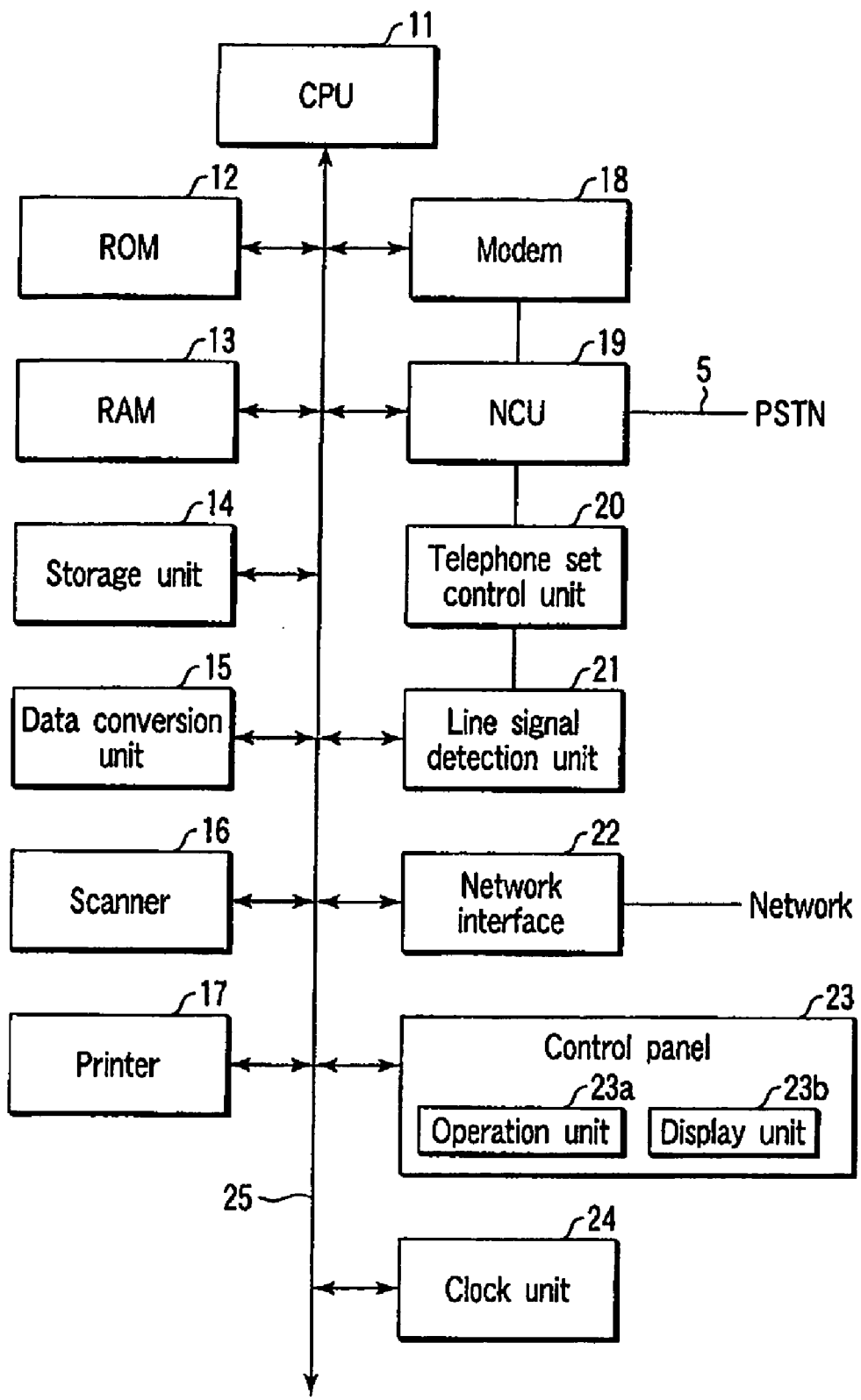
FIG. 2 is a block diagram showing a main configuration of an MFP in the first embodiment.

FIG. 2 is a block diagram showing a main component of the MFP 1. The MFP 1 has a CPU 11, a ROM 12, a RAM 13, a storage unit 14, a data conversion unit 15, a scanner 16, a printer 17, a modem 18, an NCU 19, a telephone set control unit 20, a line signal detection unit 21, a network interface 22, a control panel 23 and a clock unit 24.

The CPU 11, ROM 12, RAM 13, storage unit 14, data conversion unit 15, scanner 16, printer 17, modem 18, NCU 19, line signal detection unit 21, network interface 22, control panel 23, and clock unit 24 are connected one another via a bus line 25. NCU 19 is connected to the modem 18 and the telephone set control unit 20. Further, the telephone set control unit 20 is connected to the line signal detection unit 21.

The CPU 11 achieves operations as the MFP 1 by performing control processing to integrally control each part on the basis of a control program stored in the ROM 12. The Rom 12 stores the control program, etc., for the CPU 11. The RAM 13 is used as such a work area to store a variety of information becoming necessary for the CPU 11 to execute a variety of processing.

The storage unit 14 is, for example, a hard disk drive (HDD). The storage unit 14 temporarily stores image data and also stores data in relation to a variety of settings of a setting of a box and the like. The box is put a name and created for a prescribed purpose. The box will be described later in details. The data conversion unit 15 conducts coding processing for redundancy compression to the image data and decodes the image data coded for the redundancy compression. The scanner 16 reads a transmission original manuscript and generates the image data indicating the manuscript. The printer 17 prints an image indicated with the image data on recording paper.

The modem 18 generates a fax transmission signal by modulating the image data and generates a command transmission signal by modulating a command instructed from the CPU 11. The modem 18 transmits these transmission signals to the PSTN subscriber line 5 via the NCU 19. The modem 18 demodulates the fax transmission signal arrived via the PSTN subscriber line 5 and supplied via the NCU 19 to reproduce the image data and demodulates the command to reproduce the command transmission signal. The NCU 19 is connected to the PSTN subscriber line 5 housed in the PSTN 6. The NCU 19 performs state monitoring and transmission processing to a network regarding the connected PSTN subscriber line 5. The NCU 19 sets a level or the like of the fax transmission signal to transmit to the PSTN subscriber line 5. The telephone set control unit 20 is connected to an external telephone set if necessary. The line signal detection unit 21 receives a signal arrives via the subscriber line 5 through the NCU 19 and the telephone set control unit 20 and detects the arrival of a prescribed signal.

The network interface 22 is used to connect these components to the network 2. The network interface 22 performs data transmission via the network 2. The control panel 23 has an operation unit 23a to receive a variety of instruction inputs from a user to the CPU 11 and a display unit 23b to display a variety of instruction inputs to be notified to the user under the control by the CPU 11. The clock unit 24 constantly performs timing operations and outputs current time information indicating a current time.

The box created by the storage unit 14 will be explained as follows. The box is created by the user, for example, in the following case. The storage unit 14 creates the box to allow the user to store data or the like on a specified document and image. In such a case, the name of the user is put to the name of the box, for example. The box is created to allow the user to perform F code relay. In this case, an arbitrary name (number) which is set by the user is put as the name of the box. The box stores a setting to transfer the facsimile data. The box is created for the user to perform transfer processing (details will be described later) to transfer the received facsimile data by using the TSI. In this case, a telephone number is put as the name of the box. The box stores the setting to transfer the facsimile data.

Next, an example of operations to creates a box (transfer box) to transfer the facsimile data by using the TSI by referring to FIG. 3-FIG. 8.

Figure 3:
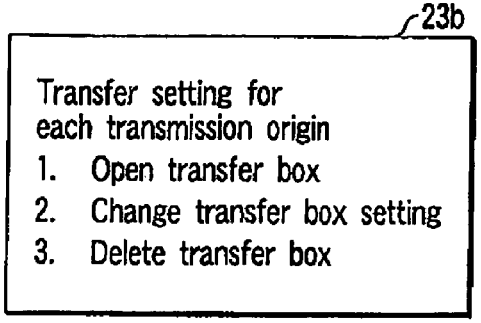
FIG. 3 is a view showing a display example of a display unit when a transfer setting is performed in the first embodiment.
Figure 4:
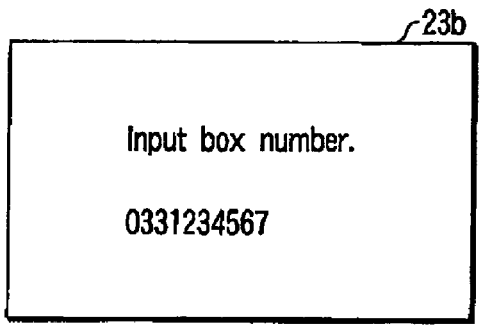
FIG. 4 is a view showing a display example of the display unit when a box number is input in the first embodiment.

At first, the user operates the operation unit 23a of the control panel 23 and calls out a screen to perform a transfer setting by transfer origin on the display unit 23b. Then, the display unit 23b displays "1: transfer box open", "2: transfer box setting change" and "3: transfer box delete" (FIG. 3). After selecting "1", the user sets the telephone number as the name of the transfer box. That is, the telephone number of the transmission origin from which the user wants to transfer the facsimile data is set. For example, if the telephone number "0331234567" is the transmission origin of the facsimile data, in other words, if the fax machine 7 is the transmission origin and when the user wants to transfer the facsimile data, the user sets the number "0331234567" as the name of the transfer box (FIG. 4). Thereby, the setting of the name of the box is completed.

Figure 6:
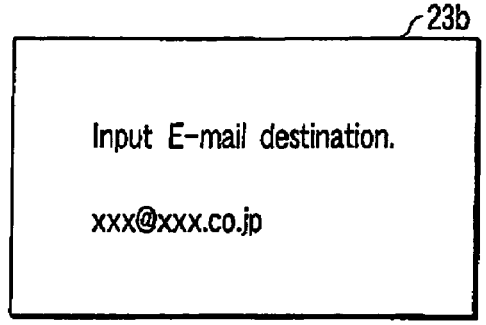
FIG. 6 is a view showing a display example of the display unit when a transfer destination of E-mail is input in the first embodiment.
Figure 7:
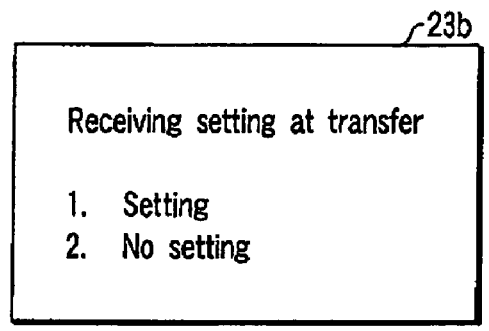
FIG. 7 is a view showing a display example of the display unit when receiving setting is performed at transfer in the first embodiment.
Figure 5:
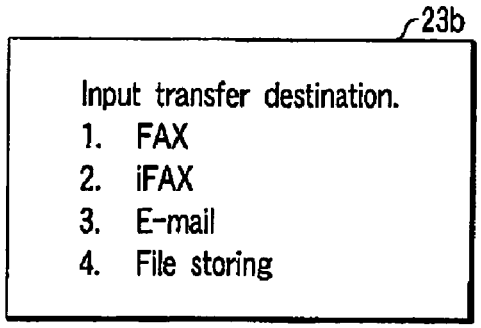
FIG. 5 is a view showing a display example of the display unit when a transfer destination is input in the first embodiment.
Figure 8:
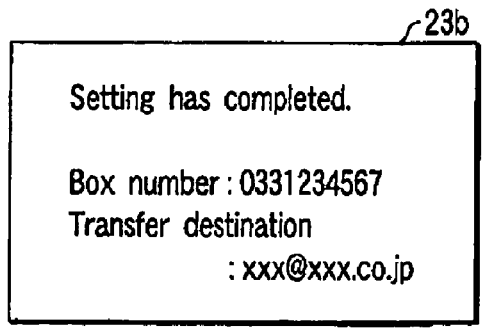
FIG. 8 is a view showing a display example of the display unit when the transfer setting is completed in the first embodiment.

After inputting the name of the box, the display unit 23b displays "1: FAX", "2: iFAX", "3: E-mail" and "4: file storage" (FIG. 5). For example, if the user wants to transfer the received facsimile data as to be E-mail, the user selects "3: E-mail". Then, the display 23b displays "Input E-mail destination". Next, the user inputs an address to which the user wants to transfer the facsimile data. The user inputs, for example, "xxx@xxx.co.jp" being an address of the PC 3 (FIG. 6). When the input of the transfer destination is completed as described above, the display unit 23b performs display to conduct a receiving setting in transfer. The user can set whether printing should be performed at the same time of the transfer or not as for the receiving setting in the transfer of the facsimile data. The user selects "1: do" as the receiving setting in the transfer in the case of execution of printing at the transfer, and selects "2: don't" in the case of no-execution of the printing in the transfer (FIG. 7). Here, assuming that the receiving setting is set not to execute the printing, a message indicating the completion of the setting and contents of the setting are displayed. If the user sets as mentioned above, the massage of "setting is completed" and "box number:

0331234567" and "transfer destination: "xxx@xxx.co.jp" is displayed on the display unit 23b (FIG. 8). The user can confirm the transfer setting on the basis of the display on the display unit 23b.

When setting such a box, the user may put a name to a box of TSI transfer by watching the telephone number of the transmission origin printed on the receiving management report (journal). For instance, the receiving of the facsimile data form a specific trade partner is transferred to the PC 3 as explained in FIG. 3-FIG. 8. At this time, if the printing is set so as not to be performed in the transfer, the user can keep confidentiality in the receiving of the facsimile data from the specific trade partner.

FIG. 9 is a table T showing the box created in the storage unit 14 and contents of the transfer destination which is set to the box. In the box number "0331234567" which is set as mentioned above, E-mail as the kind of the transfer, "xxx@xxx.co.jp" as the transfer destination and "don't" as the receiving setting to define the performing of the receiving setting in the transfer are set. In addition to the box created as stated above, boxes with FAX, iFAX and file storing and the like set therein are created, respectively. The setting of the telephone number being transmission origin, setting of the transfer destination and receiving setting are set to these boxes, respectively. The user can set in advance the setting whether the transfer function (TSI transfer function) based on the setting of the box created like this is made effective or ineffective by operating the operation unit 23a of the control panel. In the embodiment, the TSI transfer function is made effective.

In addition to the above-mentioned box, a box to perform transfer through the F code relay using the "SUB" is also created. Such a box is one being put "12345" as a box number. FAX and a telephone number "034567890" are set as the kind of transfer and a transfer destination, respectively.

For contents to be set to the box, a setting whether a list indicating the transfer at the time of the transfer should be output or not, a setting whether the fact of the transfer should be notified or not and a setting of the notification destination may be performed in addition to settings of the kind of transfer, transfer destination and receiving.

The number of the transfer destinations which are set to the box is not limited to one, a plurality of transfer destinations may be set to the box. In this case, a plurality of transfer kinds of FAX, iFAX, E-mail and file storing may be set, respectively and may be set in arbitrary combinations.

Figure 10:
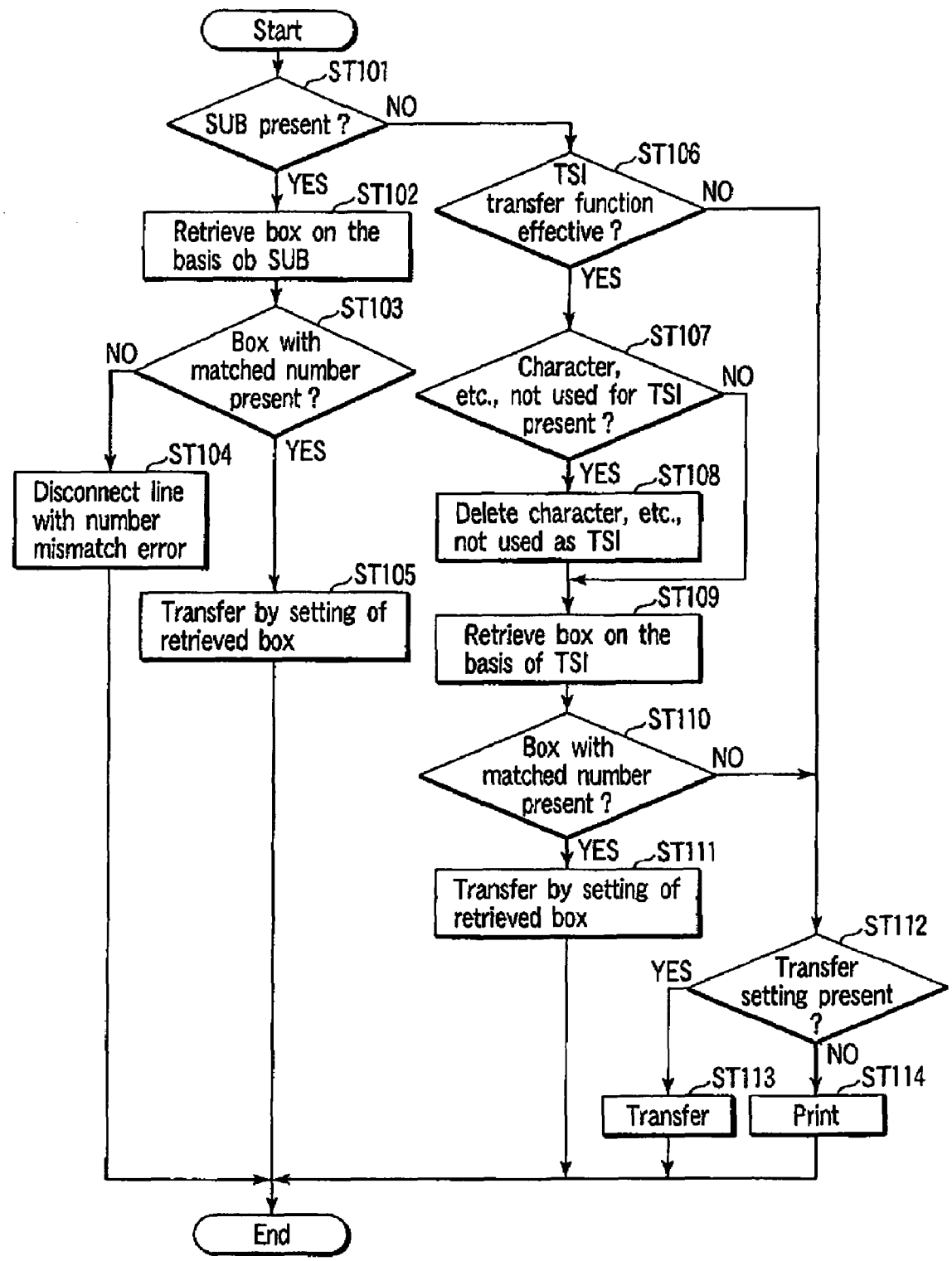
FIG. 10 is a flowchart showing a main component of processing executed by a CPU when facsimile data is received in the first embodiment.

Next, transfer processing executed by the CPU 11 when the facsimile data is received will be described. FIG. 10 is a flowchart showing a main component of the transfer processing.

When receiving the facsimile data via the PSTN 6, the CPU 11 determines whether or not the SUB is added to the facsimile data (ST101). If the CPU 11 determines that the SUB is added to the facsimile data (YES, in ST101), the CPU 11 retrieves whether or not the box with the number matching to the number indicated by the SUB is created (ST102). This retrieval is executed by referring to the table T in the storage unit 14. Then, the CPU 11 determines whether or not the box with the number matching to the number indicated the SUB is present in the table on the basis of the retrieval result (ST103). If the CPU 11 determines that the box with the number matching to the number indicated by the SUB is not present (NO, in ST103), the CPU 11 determines that the telephone number is mismatch with each other and disconnects the line to terminate the processing (ST104). In the case of the mismatch of the numbers like this, the CPU 11 does not receive the facsimile data. If the CPU 11 determines that the box with the number matching to the number indicated by the SUB is present in the table (YES, in ST102), the CPU 11 transfers the facsimile data stored in the retrieved box once to the transfer destination which is set to the retrieved box (ST105).

In contrast, if the CPU 11 determines that the SUB is not added to the facsimile data (NO, in ST101), the CPU 11 determines whether or not the TSI transfer function is made effective (ST106). If determining that the TSI function is made effective (YES, in ST106), the CPU 11 determines whether or not the characters or the like not used by the TSI are present in the received TSI (ST107). Normally, numeric characters indicating the telephone number of the transmission origin are used in the number indicated by the TSI. However, some apparatuses transmit the TSI including spaces, symbols such as hyphens and characters such as "via Fax". Therefore, the CPU 11 determines whether or not the spaces, symbols and characters other than numeric characters are included in the TSI.

If the CPU 11 determines the presence, in the TSI, of the spaces, symbols and characters not used in the TSI (YES, in ST107), the CPU 11 deletes the spaces, symbols and characters from the TSI (ST108). Thereby, the TSI becomes to be composed of only numeric characters indicating the telephone number. If the CPU 11 determines the absence, in the TSI, of the spaces, symbols and characters (NO, in ST107), the CPU 11 passes the processing in Step ST108.

The CPU 11 retrieves the presence of the box with the number matching to the number indicated by the TSI (ST109). This retrieval is executed by referring to the table T. The CPU 11 determines whether or not the box with the number matching to the number indicated by the TSI is present in the table on the basis of the retrieval result (ST110). If it is determined that there is the box with the number matching to that number (YES, in ST110), the CPU 11 transfers the facsimile data stored in the box once on the basis of the setting content which has set to the box (ST111). If it is determined that there is no box with the number matching to that number (NO, in ST110), the CPU 11 determines whether or not the transfer setting has performed (ST112). The transfer setting is conventional one and the CPU 11 determines whether or not the setting to uniformly transfer the received facsimile data to the preset transfer destination. In the case of determination of the setting of the uniform transfer (YES, in ST112), the CPU 11 transfers the facsimile to the preset transfer destination (ST113). If the case of determination of no-setting of the uniform transfer (NO, in ST112), the CPU 11 performs printing by controlling the printer unit 17 on the basis of the received facsimile data (ST114).

Next, operations when the MFP 1, which has been configured as described above, receives the facsimile data to which the SUB is not added from the fax machine 7 will be explained.

When receiving the facsimile data from the fax machine 7, the MFP 1 retrieves, from the table T, if there is a box with the box number matching to the telephone number "0331234567" of the TSI added to the facsimile data. At this time, if the TSI includes data on spaces, symbols and characters, the box number is retrieved after the data is deleted. The MFP 1 transfers E-mail with the facsimile data added thereto to the transfer destination "xxx@xxx.co.jp" which has been set for the box number "0331234567", i.e., PC 3.

Successively, operations when the MFP 1 receives the facsimile data to which the SUB is added from the fax machine 7 will be explained.

The sender sets, for example, "12345" as the SUB by the fax machine 7 and transmits the facsimile data. In the case of addition of the SUB to the facsimile data, the box number is retrieved in a manner that the number indicated by the SUB is taken priority over the number indicated by the TSI. After the facsimile data is stored once into the retrieved box number "12315", the facsimile data is transferred to the telephone number "0345678901" which has been set to the box. That is, the facsimile data is transferred to the fax machine 8. When the facsimile data with the SUB added thereto is received, if the box with the number matching to the number indicated by the SUB cannot be retrieved, an error is caused and the line is disconnected.

The MFP 1, according to the first embodiment, when the facsimile data is transmitted from the fax machines 7, 8 via the PSTN 6, the MFP 1 transfers the facsimile data though the transfer setting which has been set to the box number matching to the number indicated by the TSI to be added to the facsimile data. Thereby, when the sender performs facsimile transmission, the apparatus on the receiving side can transfer the facsimile data in response to the transmission origin without regard to the transfer by means of the apparatus on the receiving side.

Sometimes, data is transmitted, wherein the TSI of the facsimile data to be received by the MFP 1 includes not only the telephone number but also the spaces, symbols and characters. Even in this case, when retrieving the box number, the MFP 1 retrieves the box number after deleting the spaces, symbols and characters not to be used for the telephone number. Accordingly, the MFP 1 can retrieve the box number by accurately read out the telephone number from the TSI.

Moreover, after the transmission of the facsimile data with the SUB added thereto, the MFP 1 retrieves the box number in a manner that the number indicated by the SUB is taken priority over the number indicated by the TSI. Therefore, if the sender has set the SUB with the intending to transfer the facsimile data to a prescribed transfer destination, the MFP 1 can take priority on the intending. If there is no box with the number matching to the number indicated by the SUB, the MFP 1 disconnects the line and does not receive the facsimile data. Accordingly, the MFP 1 can prevent that the facsimile data is transferred to the transfer destination not intended by the sender or the facsimile data is received to be printed.

In the forgoing embodiment, the MFP 1 has the SUB, TSI and transfer function. The MFP 1; however, may have only the TSI transfer function.

The MFP 1 may transfer only the facsimile data from the specific transmission origin at the effective time of the TSI transfer function without performing receiving and printing of the facsimile data and the transmission origin other than the specific transmission origin may perform the receiving and printing. According to this operation, the MFP 1 can keep confidentiality when receiving the facsimile data from the specific transmission origin.

SECOND EMBODIMENT

A second embodiment is another embodiment in which received facsimile data at MFP performs a transfer setting of the received facsimile data. More particularly, a PC connected via a network performs a transfer setting of the received facsimile data in the MFP. The same members as those of the first embodiment are designated with the same reference number. Therefore, the case that the user uses the PC 3 to perform the transfer setting of the received facsimile data received by the MFP 1 will be described. For the transfer of the data, the transfer destination is used, wherein the transfer destination is set in association with the name of the box and the box used in the TSI and the F code of the received facsimile data. Since the transfer treatment of the data and the component of the MFP 1 are similar to those of the first embodiment, its explanation will be eliminated.

FIG. 11 to FIG. 15 show display screens displayed on the display unit 2b of the PC 3 when the PC 3 performs the transfer setting of the received facsimile data received by the MFP 1. The display unit 3b displays a menu screen displaying "apparatus", "job", "log", "registration", "counter", "user management" and "manager" as items. This menu screen can be called out on the display unit 3b of the PC 3 when the user operates the operation unit 3a of the PC 3.

Figure 11:
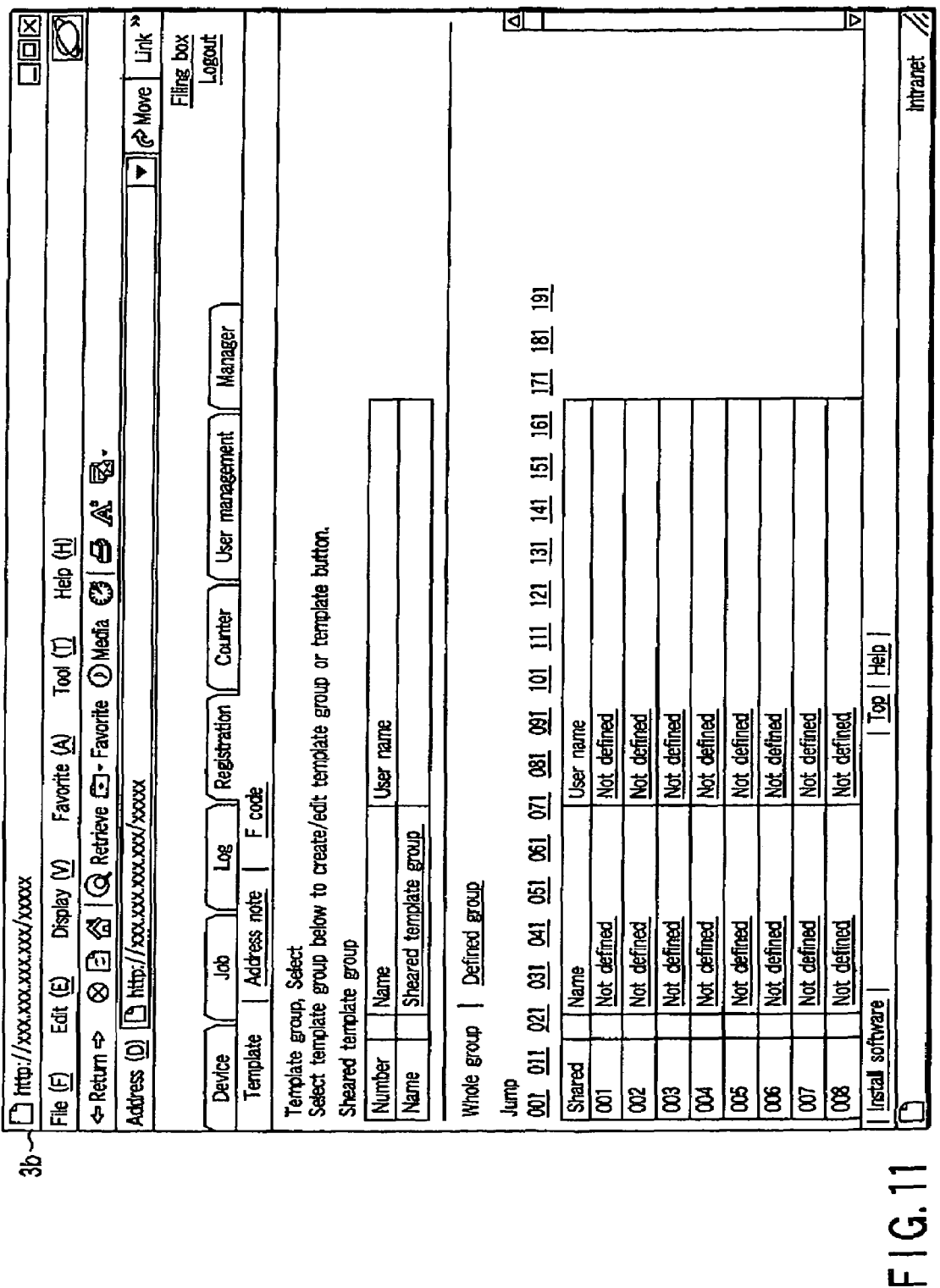
FIG. 11 is a view showing a display example of a display unit of a PC when an item "register" is selected by the PC in a second embodiment.

If "registration" is selected among the items, as shown in FIG. 11, a screen capable of registering contents in relation to "template" is displayed on the display unit 3b. On the screen with the "registration" selected thereon displays items of "address note" and "F code" in addition to the item of "template" to be selected. The user operates the operation unit 3a to perform the transfer setting and selects "F code".

Figure 12:
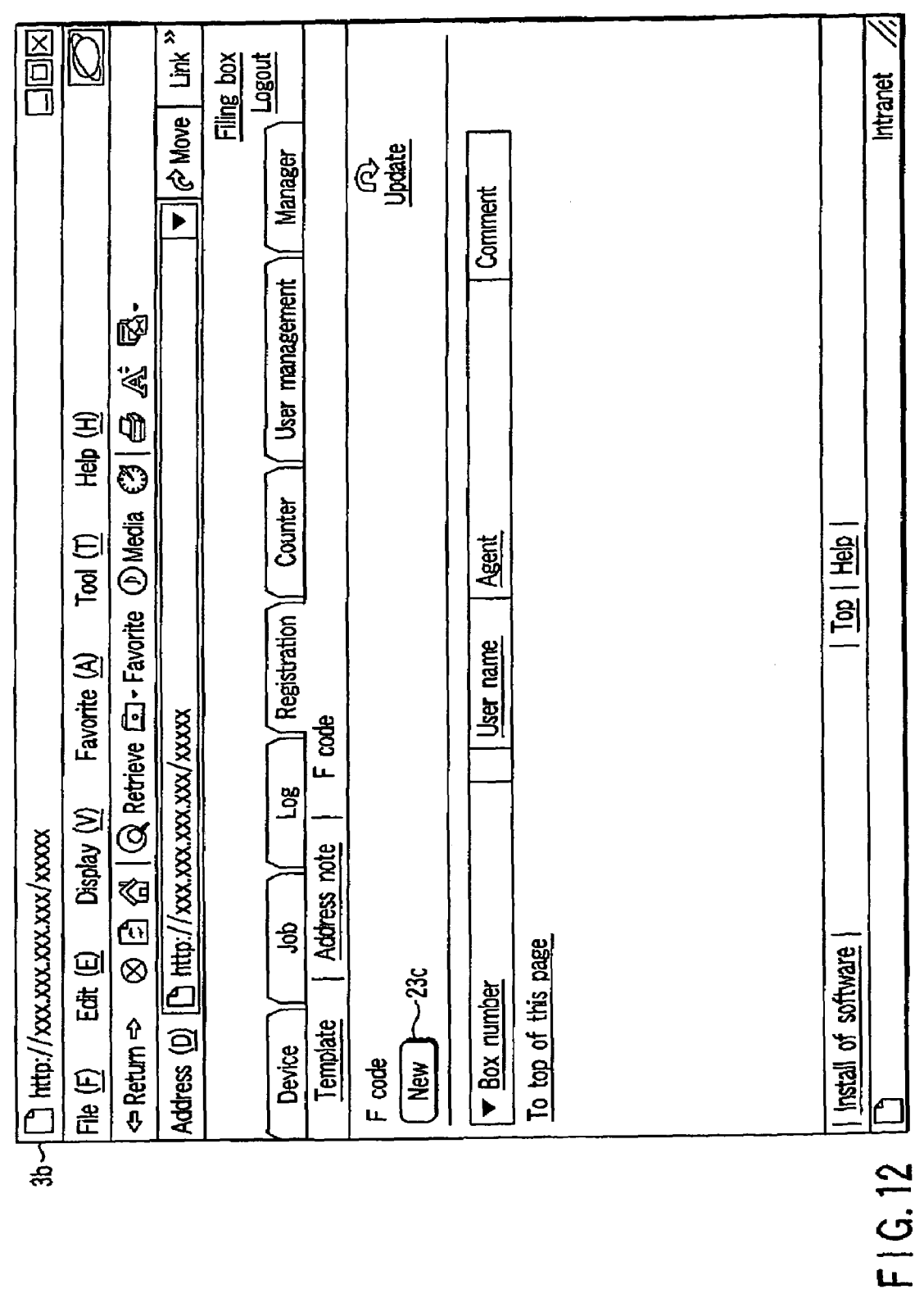
Figure 13:
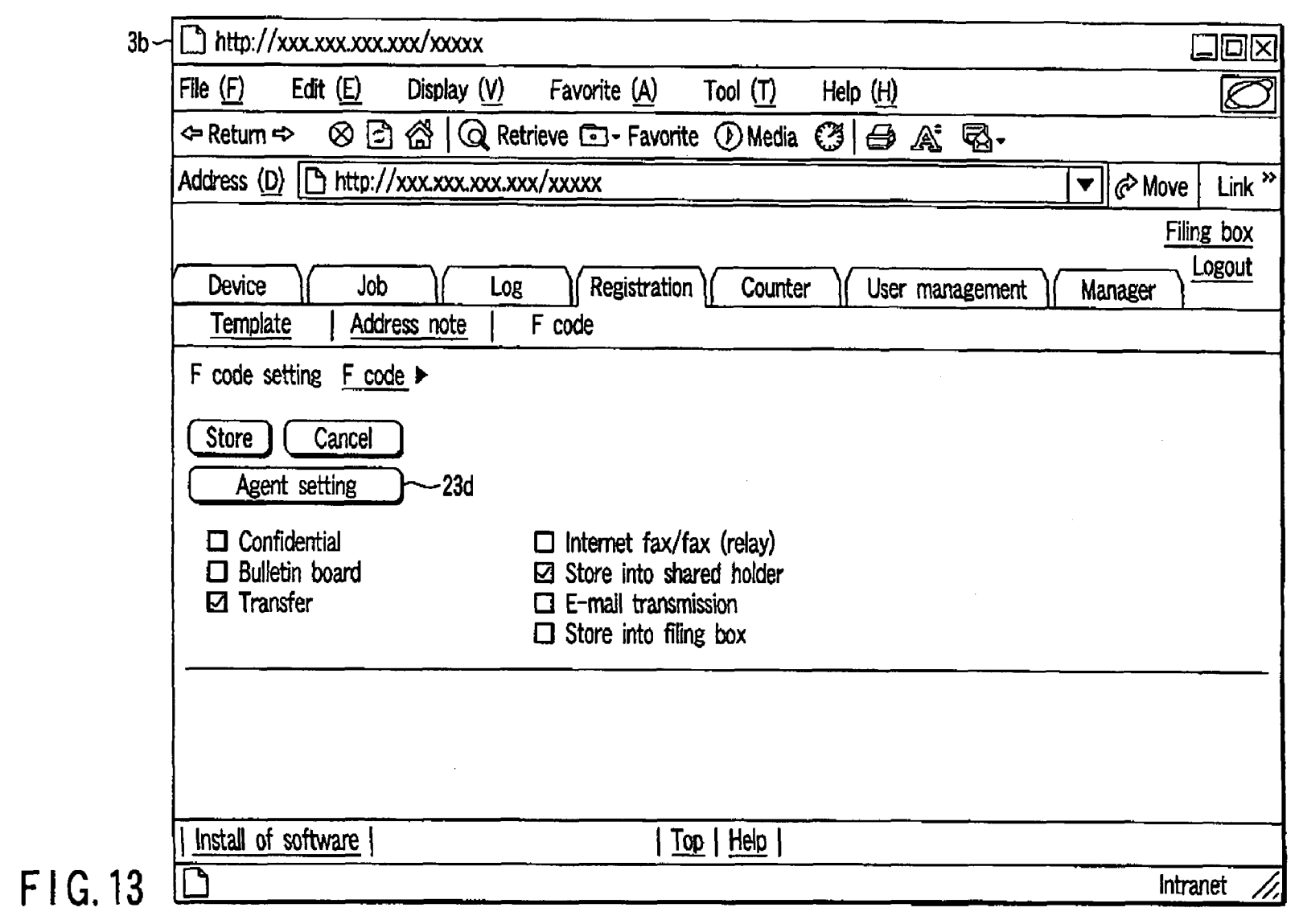

FIG. 12 shows a screen which is displayed on the display unit 3b when the item of "F code" is selected. When setting a new F code, the user operates the operation unit 3a to input a new button 23c. When the new button 23c is input, a setting screen for the F code is displayed on the display unit 3b, as shown in FIG. 13. The setting screen displays check boxes for "confidential", "bulletin board" and "transfer". In FIG. 13, the check box for "transfer" has been checked. The setting screen displays check boxes for "Internet fax/fax (relay)", "store into shared holder", "E-mail transmission", and "store into filing box", as transmission destinations. The user operates the operation unit 3a of the desired transfer destination to check the check boxes and sets the transfer destination. Since "store into shared holder" has been checked in FIG. 13, a shared holder is set as the transfer destination.

While the case in which one shared holder is set as the transfer destination has been explained in the second embodiment, it is to be understood that the invention is not limited to the second embodiment. Either E-mail transmission or filing box as well as the shared holder may be set as the transfer destination. The E-mail transmission and the filing box as well as the shared holder may be set as the transfer destination. Further, the E-mail transmission and the filing box may be set as the transfer destination, and the filing box as well as the E-mail transmission may be set as the transfer destination. As described above, in the second embodiment, seven kinds of transfer destinations can be set.

In succession, a setting method for the box number will be described. At first, the user operates the operation unit 3a to input an icon 23d of "agent setting" shown in FIG. 13. If the icon 23d is input, the display unit 3b displays the display, shown in FIG. 14 and including an "F code setting" icon 23e to set the F code. In this display screen, if the icon 23e is input, a screen to set the F code shown in FIG. 15 is displayed. The user inputs the number of the TSI in a field of the box number shown in FIG. 15. For example, when transferring the facsimile data received from the fax machine 7, the user sets the number "0331234567". In addition, the user inputs a password, a user name, etc., if necessary. By inputting a storing button 23f, the transfer setting is stored. In other words, as explained by referring to FIG. 9, the transfer kind and the transfer destination are set to the MFP 1 in accordance to the box number. If a plurality of transfer destinations are set to the box number, a plurality of transfer kinds and transfer destinations are set to the MFP 1 in response to a single box number.

AS mentioned above, the second embodiment can have an effect similar to that of the first embodiment even if the PC 3 performs the transfer setting for the facsimile data received from the MFP 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus, comprising:
   a receiving unit configured to receive facsimile data with transmission terminal identification data added thereto;

a SUB data determining unit configured to determine whether SUB data to specify a box created in a storage unit is included in the facsimile data;

a first transfer unit configured to transfer the facsimile data to a transfer destination set in the box specified by the SUB data when the SUB data determining unit determines that SUB data is included and the box specified by the SUB data is present in the storage unit, wherein the first transfer unit terminates receiving the facsimile data when the box specified by the SUB data is not present;

a determining unit configured to determine, when SUB data is not included in the facsimile data, whether the received facsimile data is transferred on the basis of the identification data received at the receiving unit;

a retrieving unit configured to retrieve whether a box to which the identification data is put as a name and to which a setting to transfer the received facsimile data is set is created in a storage unit when the determining unit determines to transfer the received facsimile data; and a transfer unit configured to transfer the received facsimile data in accordance with the setting of the box if the retrieving unit determines a presence of the box.

2. The image forming apparatus, according to claim 1, further comprising:

a delete unit configured to delete spaces, characters and symbols not used as the transmission terminal identification data therefrom, wherein the retrieving unit performs the retrieval on the basis of the identification data after deleting by the delete unit.

3. The image formation apparatus, according to claim 1, further comprising: a setting unit configured to set whether or not the facsimile data received at the transfer unit is printed when the facsimile data received at the transfer unit is transferred.

4. The image forming apparatus, according to claim 1, wherein the identification data is TSI.

5. The image forming apparatus, according to claim 1, wherein the transfer destination is at least one of FAX, iFAX, E-mail and file storing.

6. The image forming apparatus, according to claim 1, wherein the box specified by the identification data and the box specified by the SUB data are managed with a shared table.

7. An image forming apparatus, comprising:

first means for receiving facsimile data with transmission terminal identification data added thereto;

second means for determining whether SUB data to specify a box created in a storage unit is included in the facsimile data;

third means for transferring the facsimile data to a preset transfer destination in the box specified by the SUB data when SUB data is included in the facsimile data and the box specified by the SUB data is present in the storage unit, wherein the third means terminates receiving the facsimile data when the box specified by the SUB data is not present;

fourth means for determining, when SUB data is not included in the facsimile data, whether the received facsimile data is transferred on the basis of the identification data received at the receiving means;

fifth means for retrieving whether a box to which the identification data is put as a name and to which a setting to transfer the received facsimile data is set is created in a storage unit when the fourth means determines to transfer the received facsimile data; and sixth means for transferring the received facsimile data in accordance with the setting of the box when the fifth means determines a presence of the box.

8. The image forming apparatus, according to claim 7, further comprising:

seventh means for deleting spaces, characters and symbols not used as the identification data from the received identification data, wherein the fifth means performs the retrieval on the basis of the identification data after deleting by the seventh means.

9. The image forming apparatus, according to claim 7, further comprising:

eight means for setting whether or not the facsimile data received at the sixth means is printed when the facsimile data received at the sixth means is transferred.

10. The image forming apparatus, according to claim 7, wherein the identification data is TSI.

11. The image forming apparatus, according to claim 7, wherein the transfer destination is at least one of FAX, iFAX, E-mail, and file storing.

12. The image forming apparatus, according to claim 7, wherein the box number specified by the identification data and the box number specified by the specifying SUB data are managed with a shared table.

13. A method for transferring facsimile data received at an image forming apparatus, comprising:

receiving facsimile data with transmission terminal identification data added thereto;

determining whether SUB data to specify a box created in a storage unit is included in the facsimile data;

when SUB data is included in the facsimile data:

transferring the facsimile data to a preset transfer destination in the box specified by the SUB data when the box specified by the SUB data is present in the storage unit, and terminating receiving the facsimile data when the box specified by the SUB data is not present;

determining, when SUB data is not included in the facsimile data, whether the received facsimile data is transferred on the basis of the received identification data;

retrieving whether a box to which the identification data is put as a name and to which a setting to transfer the received facsimile data is set is created in a storage unit when it is determined that the received facsimile data is transferred; and transferring the received facsimile data in accordance with the setting of the box when a presence of the box is determined.

14. The method, according to claim 13, further comprising:

deleting spaces, characters and symbols not used as the identification data from the received identification data, wherein the retrieval is performed on the basis of the identification data after space, characters and symbols not used as the identification data have been deleted.

15. The method, according to claim 13, further comprising:

printing the received facsimile data if it has been set to print the facsimile data when transferring the facsimile data.

16. The method, according to claim 13, wherein the identification data is TSI.

17. The method, according to claim 13, wherein the transfer destination is at least one of FAX, iFAX, E-mail and file storing.

18. The method, according to claim 13, wherein the box number specified by the identification data and the box number specified by the specifying data are managed with a shared table.

* * * * *

UNITED STATES PATENT AND TRADEMARK OFFICE
CERTIFICATE OF CORRECTION

PATENT NO.          : 7,589,855 B2
APPLICATION NO. : 11/165790
DATED                   : September 15, 2009
INVENTOR(S)        : Izumisawa et al.

Page 1 of 1

It is certified that error appears in the above-identified patent and that said Letters Patent is hereby corrected as shown below:

Column 10, line 10: replace "eight" with --eighth--

Column 10, line 19: delete "number"

Column 10, line 20: delete "number"

Column 10, line 20: delete "specifying"

Column 10, line 50: replace "space" with --spaces--

Column 10, line 61: delete "number"

Column 10, line 61-62: delete "number"

Signed and Sealed this

Third Day of November, 2009

David J. Kappos
*Director of the United States Patent and Trademark Office*